United States Patent [19]

Thurston

[11] Patent Number: 5,269,070
[45] Date of Patent: Dec. 14, 1993

[54] INSTRUMENT FOR MEASURING FLATNESS OR UNIFORMITY OF CURVATURE

[76] Inventor: Wm. H. Thurston, 5613 Soledad Mtn. Rd., La Jolla, Calif. 92037

[21] Appl. No.: 962,850

[22] Filed: Oct. 19, 1992

[51] Int. Cl.⁵ .............................. G01B 11/24
[52] U.S. Cl. ...................... 33/533; 33/285; 33/1 N; 33/DIG. 21; 33/501.04
[58] Field of Search .............. 33/533, 534, 538, 521, 33/501.04, 501.5, 285, 286, DIG. 21, 1 N, 1 PT; 356/138, 141, 152, 237, 371, 376; 250/231.1, 231.11

[56] References Cited

U.S. PATENT DOCUMENTS

| | | | |
|---|---|---|---|
| 4,434,558 | 3/1984 | Face, Jr. et al. | 33/533 |
| 4,589,773 | 5/1986 | Ido et al. | 356/376 X |
| 4,818,173 | 4/1989 | Khusro | 356/152 X |
| 4,897,927 | 2/1990 | Nicol | 33/534 |
| 4,904,081 | 2/1990 | Miyahara | 356/152 |
| 5,052,800 | 10/1991 | Mimmack et al. | 356/152 |

FOREIGN PATENT DOCUMENTS 0287149 10/1988 European Pat. Off. ......... 33/1 N
0098901 4/1989 Japan ......................... 33/533

OTHER PUBLICATIONS

W. E. Goetz et al., "Triaxial Optical Angular Measuring System" IBM Technical Disclosure Bulletin, vol. 15 No. 3, Aug. 1972.

*Primary Examiner*—Thomas B. Will
*Assistant Examiner*—Alvin Wirthlin
*Attorney, Agent, or Firm*—John R. Ross

[57] ABSTRACT

An instrument for determining the profile of a surface. Two hinge plates are attached to each other at a hinge joint. A collimated light source on one of the hinge plates produces a spot on a position sensitive photo detector on the other hinge plate. An electrical circuit is provided to produce an electrical signal based on the relative position of the spot as the instrument flexes as it is slid along the surface. In preferred embodiments the electrical signal is a measure of the surface profile or the change in slope of the profile.

11 Claims, 2 Drawing Sheets

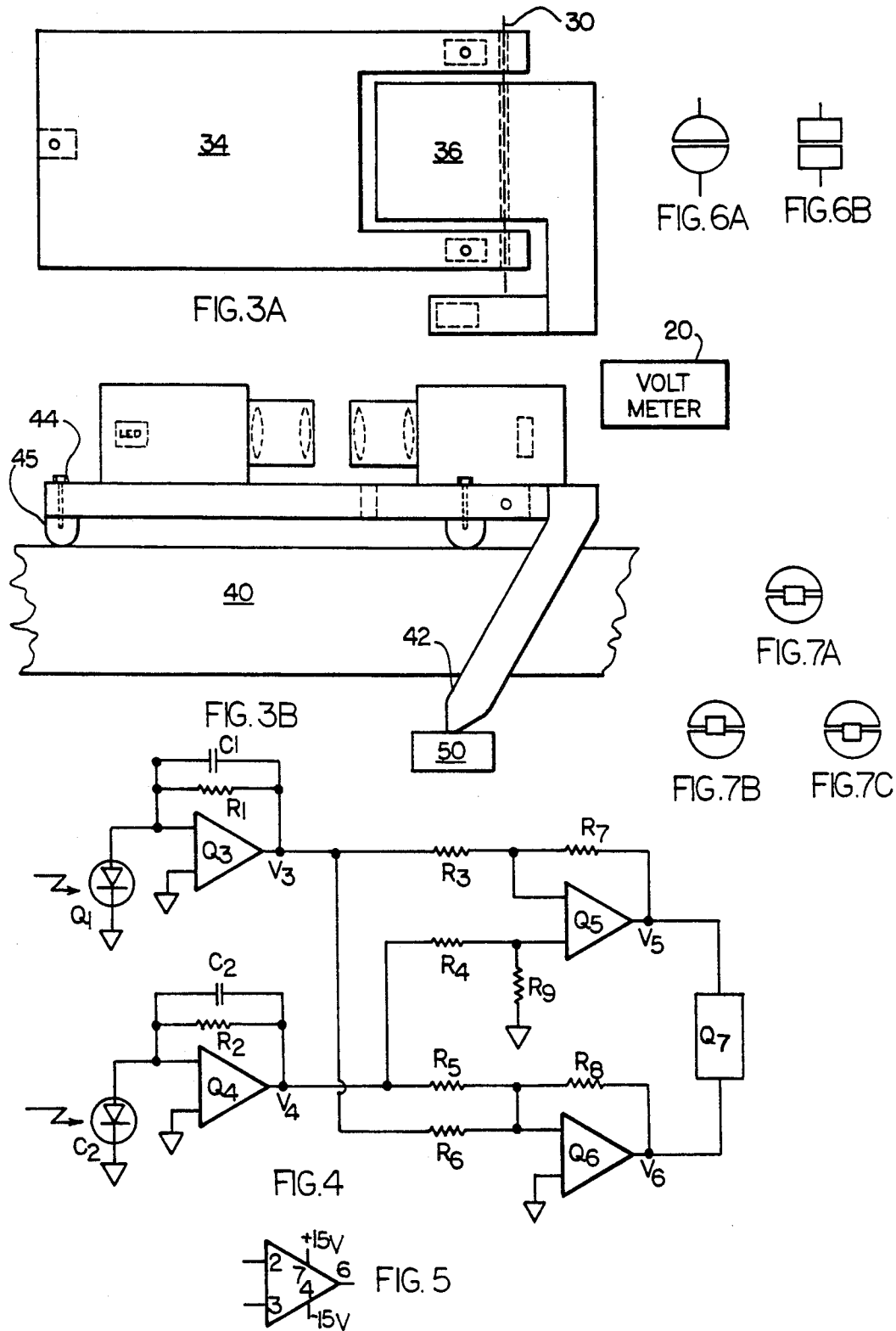

INSTRUMENT FOR MEASURING FLATNESS OR UNIFORMITY OF CURVATURE

This invention relates to measurement instruments and especially to instruments for measuring flatness or uniformity of curvature of objects.

BACKGROUND OF THE INVENTION

The uniformity requirements for flat surfaces and curved surfaces are related to their usage. Nothing is perfectly flat or perfectly cylindrical; however, many machine parts are required to be flat to within an accuracy of 0.00001 inch. Rollers used in the manufacture of thin films and foils have similar accuracy requirements. The flatness or curvature of mirrors must be checked to assure proper manufacture. NASA recently learned a sad lesson on the consequences of not properly testing the curvature of the Hubbell telescope mirror.

Instruments available for the measurement of flatness are typically autocollimators or are based on the interferometer principal. The autocollimator projects a light beam that is reflected onto a detector from a reflector unit which is moved across the test surface. The autocollimator measures the direction of the reflection which represents the minute variations in the slope across the surface. A profile is determined from the slope values. Interferometers interfere a beam of coherent light with a reflected beam to measure slopes in terms of the wavelength of the light. These devices are typically complicated to use.

The roundness of cylinders up to about two feet are typically checked with micrometer type devices. What is needed is an easy to operate instrument which can measure flatness, straightness and uniformity of curvature with no upper size limits.

SUMMARY OF THE INVENTION

The present invention provides an instrument for determining the profile of a surface. Two hinge plates are attached to each other at a hinge joint. A collimated light source on one of the hinge plates produces a spot on a position sensitive photo detector on the other hinge plate. An electrical circuit is provided to produce an electrical signal based on the relative position of the spot as the instrument flexes as it is slid along the surface. In a preferred embodiment the electrical signal is a measure of the surface profile. In another preferred embodiment the signal is a measure of the change in slope of the profile.

BRIEF DESCRIPTION OF THE DRAWINGS

FIGS. 3A and 3B show similar views of a third embodiment.

FIG. 4 shows a preferred electrical circuit for producing a signal descriptive of a surface profile.

FIG. 5 shows some details of the electrical circuit.

FIGS. 6A and 6B show two versions of bi-cell detectors.

FIGS. 7A, 7B, and 7C show light focused on different sections of a bi-cell detector.

DETAILED DESCRIPTION OF PREFERRED EMBODIMENTS

A preferred embodiment of the present invention can be described by reference to the figures.

BASIC UNIT—PROTOTYPE

Figure 1A:
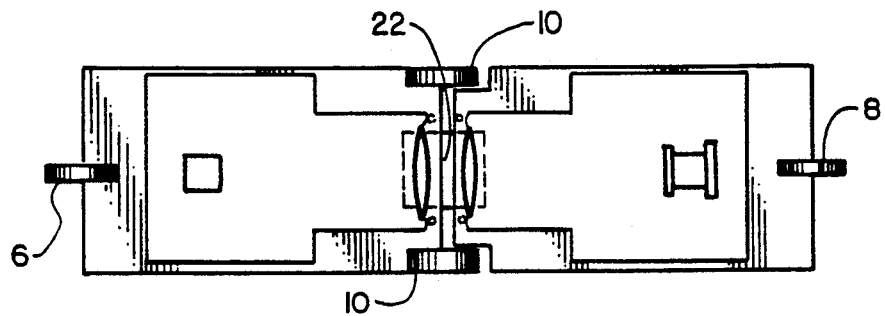
FIGS. 1A and 1B show the top and side views of a preferred embodiment of the present invention.
Figure 1B:
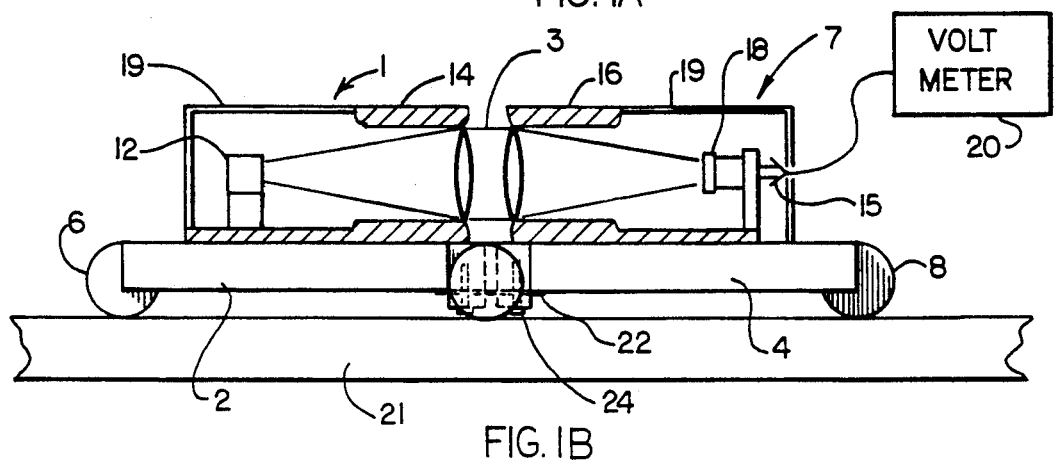

FIG. 1A is top view and FIG. 1B is a side view of a preferred embodiment of the present invention which was fabricated and tested by Applicant. Collimator 1 on hinge plate 2 contains a light source 12 which in this case is a light emitting diode (LED) and a lens assembly 14 that forms collimated light beam 3 which enters lens assembly 16 in light receiver 7 and is focused by lens assembly 16 to a spot of about one square millimeter on bi-cell photo-detector 18 located on hinge plate 4. This bi-cell detector available from United Detector Technology comprises two separate photo detectors as shown in FIGS. 6A and 6B. Slider legs 6, 8, 10 and 10 slide along "flat" surface 21 to be measured for flatness. The output of one of the detectors is subtracted from the other electronically by Q5 as shown in FIG. 4, and the two detector signals are summed by Q6, and the difference to the sum is accomplished by divider Q7. The output of Q7 may by further amplified, if necessary, and applied to a meter (such as voltmeter 20 shown in FIG. 1B), oscilloscope or computer. Covers 19 shown on FIG. 1B reduce background light. The two plates 2 and 4 are hinged together by hinge leaf 22 which in this embodiment is comprised of stainless steel shim stock 0.004 inch thick and ½ inch wide. This hinge leaf provides for flexure without play. With Applicant's prototype device, the voltage was measured with an oscilloscope. The output with the beam perfectly centered at the midpoint of the two detectors was about zero microvolts. A change in elevation of slider 8 of 25 microns (0.001 inch) produced a voltage of 5 volts. The electrical noise level, which determines the smallest surface variation that can be measured, was 9 millivolts RMS (mostly 60 cycle pickup) with an unshielded circuit. I estimate a noise level of about 1 millivolt with shielding. Therefore, surface variations in the range of 0.05 microns (or 2 microinches) can easily be measured. To make this device more convenient to use two small 1 ½ volt batteries could be installed on each hinge plate to provide power and a little voltmeter added to hinge plate 4 to provide a direct reading of the change in slope.

UNIT FOR MEASURING CURVATURE

Figure 2A:
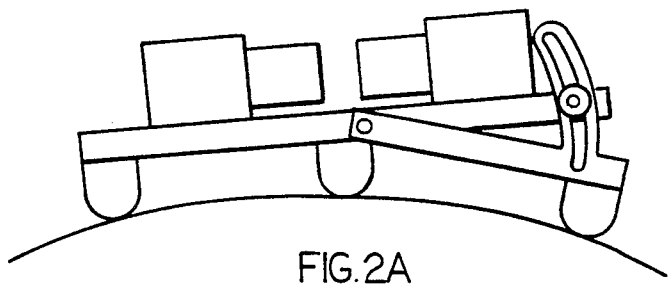
FIGS. 2A and 2B show the side and top views of another embodiment.
Figure 2B:
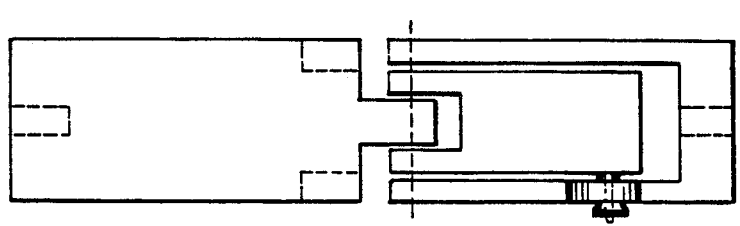

FIGS. 2A and 2B show the side and top views of an embodiment useful for measuring the variation in curvature of curved surfaces either convex or concave.

MEASURING FLATNESS AND CURVATURE FROM REFERENCE RAIL

The configuration shown in FIGS. 3A and 3B lends itself to measuring the profiles of surfaces that range in size from a fraction of an inch to several feet. One hinge plate 34 rides on a rail 40 that serves as a reference surface, and the other hinge plate 36 with its elongated slider leg, or stylus 42, rides the surface of part 50 being measured. The downward force exerted by the stylus is reduced to an acceptable minimum by the location of the center of gravity of the right-hand side with respect to the hinge pin 30. The optical part of the right-hand side could be held in place by means that permit some back-and-forth adjustment. Since the light is parallel between the optical projector and the optical receiver, an adjustment that changes the spacing would have no effect on the measurements. The lever-arm, as shown in FIG. 3B (this lever arm is the lateral distance between the axis 30 and the scan point 31 on the surface of part 50), is made reasonably small because the smaller it is, the larger will be the angle of flexure of the hinge for a given profile. The stylus could be on either side of the vertical line through axis 30. With a stylus tip preferably made of teflon, or similar sturdy plastic that would not scratch glass, this configuration is suitable for measuring the surface profile of optical and mechanical parts from small sizes to whatever length of rail is manageable. Since there is a direct proportionality between small upward-downward movement of the stylus and the flexure angle, no calculus is needed. A scan gives the profile directly. Long rails might require an accounting for sag, which could be measured with the "standard" instrument as described earlier. The contribution of the instrument's weight to the sag would be included in the sag profile. Adjustment screw 44 lengthens or shortens slider 45 to null the instrument.

THE CIRCUIT

The photo-currents that are produced in the photo-detector require amplification and then comparison. A suitable circuit for use with all of the above mechanical configurations, is shown in FIG. 4. Q1 and Q2 represent the two independent photosensitive electrodes in the bi-cell. Q3 and Q4 are amplifiers that serve here as transconductance amplifiers, meaning that an input photo-current i1 arriving at pin 2 (compare FIGS. 4 and 5) is pulled away through R1 by the necessary and sufficient voltage V3 arriving at pin 6.

Thus, the voltage $V3=(i1)(R1)$ and $V4=(i2)(R2)$. V3 and V4 are both applied to Q5 which is connected as a unity-gain difference amplifier, meaning that $V5=V3-V4$. Also, V3 and V4 are both applied to Q6 which is connected as a unity-gain summing amplifier, meaning that $V6=V3+V4$. V6 will always be positive, but the polarity of V5 may be positive or negative depending on whether V3 is larger or smaller than V4. Depending on which way the photo-cell electrodes, Q1 and Q2, are connected to Q3 and Q4, a positive value for V5 might mean that more light is falling on the upper electrode than is falling on the lower electrode. Then a negative value would mean that more light is on the lower electrode. V5 will be re-defined as D, and V6 will be redefined as S. Thus the divider takes the ratio D/S and also imparts a gain of 10.

The significance of taking the ratio may be realized from an example. Assume that light is falling unequally on the photo-elements in the bi-cell so that $V3=5.00$ volts and $V4=4.00$ volts. Then $D=1.00$ volts and $S=9.00$ volts. The ratio is 0.111. Now suppose that the power supply jumps up enough to increase the brightness of the light source by 10%. The op-amps highly reject power supply changes, but V3 becomes 5.50 volts and V4 becomes 4.40 volts. Then D becomes 1.10 volts and S becomes 9.90 volts, and the ratio is still 0.111. When the gain of 10 imparted by the divider is accounted for, the output of the divider, in this example, is 1.11 volts.

Changes amounting to several percent in the brightness of the light source may be due to temperature. For instance, if the light source is an LED, its brightness will decrease about 1% for an increase of 1 degree C., but again, the ratio will be extremely unaffected. Thus, involving the ratio offers a high immunity to all parameters that might be detrimental to the data.

The maximum specified value for S is 10 volts, which determines the values selected for R1 and R2. They must provide Q3 and Q4 with sufficient gain to put V5 and V6 in the range of 4 to 5 volts each. In the simplest case, the output as shown would go to a meter that reads positive and negative voltages ranging from millivolts, or even microvolts, to 10 volts.

High-gain amplifiers such as Q3 and Q4 have a tendency to oscillate unless small capacitors, C1 and C2, are connected as shown. The unity-gain amplifiers, Q5 and Q6 do not have this requirement.

Many different circuits are possible. For example, the divider might be followed by more gain, and/or a scaling circuit that would equate a given voltage to a particular angle of flexure on the said hinged optical system. The foregoing circuit description deals with a direct-current light source and direct-current processing. If the light source is pulsed to achieve brighter flashes without overheating, then demodulation and filtering would proceed the sum and difference amplifiers.

The components of this embodiment are readily available. For example, by reference to the circuit shown in FIG. 5, Q1 and Q2 are bi-cell detectors available from United Detector Technology. Q3 through Q6 are OPA-111 available from Burr Brown. Divider DIV-1000 is also available from Burr Brown. C1 and C2 are 10 picofarad capacitors. R1 and R2 are 82 kilohm resistors matched to 1 percent. R3 through R8 are 25 kilohm resistors matched to 1 percent.

SMALLER UNITS

Smaller embodiments can be made by using the kind of light projector that is built into optical couplers such as optical encoder modules. Some of these light sources have a special lens that is located directly over an LED to form a parallel light beam. In the case of the Hewlett-Packard HEDS-9700 module, the parallel light emerges from a body that measures only 0.4 inch wide by 0.5 inch high by 0.2 inch thick. Such a unit could be mounted on a very short hinge plate. If the bi-cell were close to the projector, with a very short focus lens, or even without a lens, the receiver side of said device could be on a very short hinge plate also. The entire device could be less than an inch long over-all.

CONCLUSION

While the above description contains many specific examples, the reader should not construe these as limitations on the scope of the invention, but merely as exemplifications of preferred embodiments thereof. Those skilled in the art will envision many other possible variations within its scope. For example, the light source could be a small laser. Scales or a rolling encoder could be added to the device to indicate horizontal position of the stylus on the surface. All electrical signals could be fed into a computer data system to provide a computer readout of surface profile. The slider legs could be made adjustable and adjustment recorded to determine gross changes in profile. A micrometer adjustment screw on stylus 42 could also provide for measurement of gross changes in profile. Accordingly, the reader is requested to determine the scope of the invention by the appended claims and their legal equivalents, and not by the examples which have been given.

I claim:

1. An instrument for measuring the profile of a test surface comprising:
   a) a first hinged plate slide means defining a first slide surface,
   b) a second hinged plate slide means defining a second slide surface, said second hinge plate slide means being attached to said first hinge plate slide means at a single hinge joint defining a single hinge axis,
   c) a collimated light source means for producing a collimated light beam mounted on one of said first or second hinged plate side means,
   d) a photo detector means comprising at least two photo detectors said photo detector means being mounted on the other of said first or second hinged plate slide means and allignable with said light beam from said collimated light source such that each of said at least two photo detectors can be illuminated simultaneously by said beam to produce electrical outputs from each of said at least two detectors, the magnitudes of the outputs of said detectors being determined by the degree of alignment of said first slide means with respect to said second slide means and the output of one of said at least two detectors increases whenever the output of at least one other of said at least two detectors decreases, and
   e) an electrical circuit means for producing electrical signals corresponding to the profile or changes of slope of said test surface based on the outputs of said at least two detectors as said slide surfaces are slid along said test surface so as to provide a substantially continuous measurement of at least a substantial portion of said profile.

2. An instrument as in claim 1 wherein said first hinge plate slide means comprises three slider legs each leg comprising a bottom slide surface wherein said first slide surface is defined by the bottom slide surface of said three slider legs and said second hinge plate slide means comprises a single slider leg comprising a bottom slide surface defining said second slide surface.

3. An instrument as in claim 1 wherein said at least two photo detectors are elements of a bi-cell detector.

4. An instrument as in claim 1 wherein said collimated light source means comprises a light emitting diode and a lens.

5. An instrument as in claim 4 and further comprising a lens to focus light from said collimated light source on said photo detector means.

6. An instrument as in claim 1 wherein said electrical circuit means comprises electrical component means for determining the ratio of the difference between the output of said at least two detectors to the sum of the output of said at least two detectors.

7. An instrument as in claim 1 wherein said collimated light source comprises a laser.

8. An instrument as in claim 1 wherein at least one of said first and second hinged plate slide means comprise legs with micrometer adjustment screws.

9. An instrument as in claim 1 and further comprising a rail means for providing a reference surface on which said first hinged plates slide means can slide and a stylus means attached to said second hinged plates slide means for sliding along said test surface.

10. An instrument as in claim 1 wherein said hinge joint is comprised of a piece of flat flexible material.

11. An instrument as in claim 10 wherein said material is stainless steel.

* * * * *